(12) United States Patent
Teglia et al.

(10) Patent No.: US 7,941,639 B2
(45) Date of Patent: May 10, 2011

(54) PROTECTION OF THE EXECUTION OF A PROGRAM

(75) Inventors: Yannick Teglia, Marseilles (FR); Pierre-Yvan Liardet, Peynier (FR); Alain Pomet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 11/481,432

(22) Filed: Jul. 5, 2006
(Under 37 CFR 1.47)

(65) Prior Publication Data
US 2007/0150952 A1 Jun. 28, 2007

(30) Foreign Application Priority Data

Jul. 5, 2005 (FR) ...................................... 05 52047

(51) Int. Cl.
*G06F 9/30* (2006.01)
(52) U.S. Cl. ........................................ 712/207; 717/130
(58) Field of Classification Search .................... 712/207
See application file for complete search history.

(56) References Cited

U.S. PATENT DOCUMENTS

| 5,408,643 A * | 4/1995 | Katayose .................. 714/55 |
| 2005/0041809 A1 | 2/2005 | Fischer et al. |
| 2005/0229164 A1 | 10/2005 | Giraud |

FOREIGN PATENT DOCUMENTS

FR  2 707 409 A3  1/1995

OTHER PUBLICATIONS

Foldoc. "Program" definition. Jul. 21, 2002. Obtained via http://foldoc.org/program.*
French Search Report from French Patent Application 05/52047, filed Jul. 5, 2005.

* cited by examiner

*Primary Examiner* — Robert Fennema
(74) *Attorney, Agent, or Firm* — Lisa K. Jorgenson; James H. Morris; Wolf, Greenfield & Sacks, P.C.

(57) ABSTRACT

A method for protecting the execution of a main program against possible traps, including, on occurrence of an instruction from the main program, starting a time counter of a given count according to next instructions of the main program, and executing, once the counter has reached its count, at least one instruction of a secondary program from which the result of the main program depends.

19 Claims, 1 Drawing Sheet

PROTECTION OF THE EXECUTION OF A PROGRAM

BACKGROUND OF THE INVENTION

1. Field of the Invention

The present invention generally relates to electronic circuits and, more specifically, to microcontrollers of execution of instruction sequences, for example, integrated in devices of smart card type.

FIG. 1 very schematically shows in the form of blocks an example of an integrated circuit 1 of the type to which the present invention applies.

Such a circuit comprises at least a central processing unit 2 (CPU), one or several memories 3 (MEM) among which generally at least a non-volatile memory (for example, a ROM) for storing programs and a RAM for containing the data during execution thereof, and an input/output element 4 (I/O) for communicating with or without contact with the outside of circuit 1. The different elements contained in circuit 1 communicate over one or several internal data, address, and control buses 5, and other circuits (for example, sensors) may be integrated to circuit 1.

The present invention more specifically relates to the protection of the execution of programs handling digital values supposed to remain within integrated circuit 1 against possible hacking attempts by fault injection in the program flow.

2. Discussion of the Related Art

Integrated circuits containing digital values supposed to remain unknown from the outside (for example, keys used by cryptography mechanisms) are likely to be hacked by persons attempting to fraudulently implement methods for creating traps in the correct execution of programs. Such methods comprise the disturbing of the circuit operation during the execution of a program (for example, by a disturbance introduced on its clock) to cause an incidental jump from the program to another instruction than that normally expected. Such a jump may enable exiting a control loop, an endless loop following an authentication error, etc. and more generally may enable interpreting the consequences of this jump to discover, even partially, the secret quantities.

There exist different mechanisms to control the flow of programs executed by electronic circuits.

A known solution comprises the performing of a so-called signature calculation during the execution of a program to be sure that all instructions have been executed.

Another known solution comprises the execution of the same program several times in parallel and the checking of the coherence of the results obtained by these multiple executions.

A disadvantage of known solutions is that the very existence of a mechanism for protecting the program execution is not transparent for the user.

Another disadvantage is that these are mechanisms of detection of a trap attempt on a program which require, in case of a detection, for specific measures to be taken, and thus another program to manage possible fraud detections.

SUMMARY OF THE INVENTION

The present invention aims at overcoming all or part of the disadvantages of known solutions for protecting programs against possible traps.

The present invention more specifically aims at providing a solution avoiding the addition, to a trap attempt detection mechanism, of a mechanism for interpreting and processing this detection.

The present invention also aims at providing a solution which requires little resources and particularly easy to implement in a microcontroller of smart card type.

The present invention also aims at providing a solution which is not detectable by a possible hacker.

To achieve all or part of these objects as well as others, the present invention provides a method for protecting the execution of a main program against possible traps, comprising the steps of:

on occurrence of an instruction from the main program, starting a time counter of a given count according to next instructions of the main program; and executing, once the counter has reached its count, at least one instruction of a secondary program from which the result of the main program depends.

According to an embodiment of the present invention, an instruction of the main program following a part of it the normal execution time of which corresponds to said count, provides a result which depends on at least one instruction of the secondary program and which is incorrect if said instruction of the secondary program is executed at a wrong time.

According to an embodiment of the present invention, the result of the main program is an arithmetical result.

According to an embodiment of the present invention, the result of the main program is the starting of a process.

According to an embodiment of the present invention, the counter is a cycle counter.

According to an embodiment of the present invention, the counter is an instruction counter.

The present invention also provides an integrated circuit comprising at least one central processing unit and memories, as well as means for implementing the protection method.

The foregoing and other objects, features, and advantages of the present invention will be discussed in detail in the following non-limiting description of specific embodiments in connection with the accompanying drawings.

DETAILED DESCRIPTION

Figure 1:
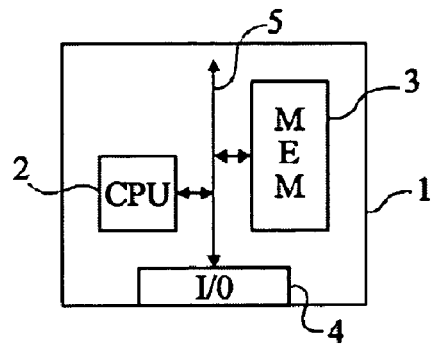
FIG. 1, previously described, very schematically shows in the form of blocks an example of an electronic circuit of the type to which the present invention applies.

For clarity, only those method steps and elements which are useful to the understanding of the present invention have been shown in the drawings and will be described hereafter. In particular, the content of the programs protected by the present invention has not been described in detail, the present invention being compatible with any program currently executed by a microcontroller.

A feature of an embodiment of the present invention is to provide, at a time of the execution of a main program to be protected, the starting of a counter which, when a given count will have been reached, will execute an instruction useful for the main program but within the framework of a secondary program. Another feature of this embodiment is to carry on with the execution of the main program during the counting and to provide the time of execution of the secondary instruction so that, in a normal operation of the main program, it occurs at an expected time.

In other words, the present invention provides transferring, to the execution of a secondary program, one or several instructions necessary to the obtaining of a correct result by the main program and causing the execution of these instructions independently from the flow of the main program after starting of a counter. Thus, in case of a trap on the main program, the instruction or the group of instructions of the secondary program will not be executed or will be executed at a wrong time, so that the results of the main program will be incorrect.

The instruction or the group of instructions executed in the secondary program are preferably instructions necessary to the main program to obtain the expected results. For example, this may be a step of an arithmetical calculation, the non-execution of which results in that the output result is not correct. According to another example, the non-execution of a step of the secondary program blocks a function of the main program, and thus the provided result (in a broad sense) is not correct. The result can thus be either the starting of any other process, or an arithmetical result.

Figure 2:
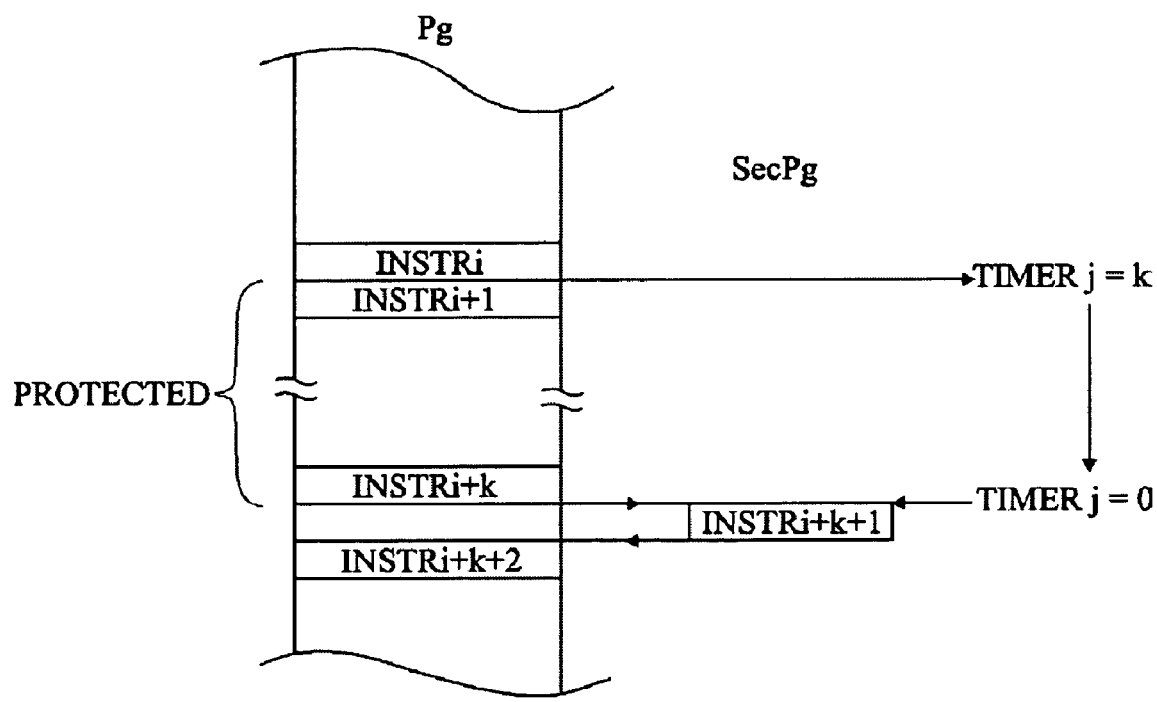
FIG. 2 illustrates an embodiment of a mechanism for protecting the flow of a program according to the present invention.

FIG. 2 illustrates, in a very simplified view, an embodiment of the present invention.

The execution of a main program Pg comprising instructions INSTR and, within this program, a portion (PROTECTED), the execution of which is desired to be protected against possible traps, is assumed. Indeed, the entire program not necessarily requires protection but, most often, only phases implementing digital values supposed to remain within the circuits. In this example, the instructions which are desired to be protected range from instruction INSTRi+1 to INSTRi+k.

At the beginning of the area to be protected, instruction INSTRi starts a counter (TIMERj) by setting it to a value j=k. A time counter is here assumed (for example, a cycle counter), but any other adapted counter (for example, an instruction counter) may be appropriate if the number of increments/decrements to be brought thereto in a normal execution of the area to be protected of the main program can be determined. However, the incrementing/decrementing of the counter is independent from the execution of the program to be protected.

The main program continues its execution normally until instruction INSTRi+k.

According to this embodiment of the present invention, the instruction which follows instruction INSTRi+k in the main program is an instruction INSTRi+k+2, a correct result of which is conditioned by the execution of an instruction INSTRi+k+1 in a secondary program SecPg. Instruction INSTRi+k+1 is executed independently from the main program once counter TIMER has reached a value j=0.

The selection of instruction INSTRi+k+1 is decided on design to be necessary to the provision of a correct result by the main program or to a normal continuation of its operation after instruction INSTRi+k, without for all this being required between the instructions of rank i+1 to i+k of the main program.

In the case where a trap of the main program occurs in the protected area, this results in a jump. Such a jump, be it while remaining in the protected area or coming out of this area, modifies the time required to reach instruction INSTRi+k. Accordingly, instruction INSTRi+k+1 will not be executed at the right time and the result provided by the main program will be erroneous.

It should be noted that the main program does not wait for the execution of the instruction of the secondary program, but uses it (for example, an operation result not linked to the values of instructions INSTRi+1 to INSTRi+k) to carry on with its own execution. Thus, the present invention provides no waiting loop.

An advantage of the present invention is that the protection of the execution of the main program comes along with no interpretation after a fraud attempt detection. Indeed, the only consequence is the incorrect execution of this program. Thus, the protection performed by the present invention is transparent for the possible hacker who does not realize that the result which is output to him is erroneous.

According to a variation, several instructions may be called for by the secondary program.

According to another variation, several secondary counters and loops are provided either in parallel or in random selection by the main program.

Of course, the present invention is likely to have various alterations, improvements, and modifications which will readily occur to those skilled in the art. In particular, the selection of the instructions to be transferred from a main program to be protected to a secondary program is within the abilities of those skilled in the art according to the application. In particular, the practical implementation of the counter so that, for example, it counts to a value compared with the current value or until an overflow, is within the abilities of those skilled in the art. Further, the practical implementation of the present invention based on the functional indications given hereabove is within the abilities of those skilled in the art, using hardware tools or conventional programmings.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method for protecting the execution of a main program, comprising:
    on occurrence of at least one first instruction of the main program, starting a counter;
    executing, once the counter has reached a value and regardless of whether the at least one first instruction has finished execution, at least one second instruction of a secondary program to produce a second intermediate result based on a first intermediate result produced by the at least one first instruction, the second intermediate result being incorrect when the at least one second instruction is executed before the at least one first instruction has finished execution; and
    regardless of whether the at least one second instruction has been executed, executing at least one third instruction of the main program following execution of the at least one first instruction to determine a result of the main program, the result being calculated based on the second intermediate result such that when the second intermediate result is incorrect or nonexistent, the result will be incorrect.

2. The method of claim 1, wherein the result of the main program is an arithmetical result.

3. The method of claim 1, wherein the result of the main program is the starting of a process.

4. The method of claim 1, wherein the counter is a cycle counter.

5. The method of claim 1, wherein the counter is an instruction counter.

6. An integrated circuit comprising at least one central processing unit and memories, and comprising means for implementing the method of claim 1.

7. A method comprising:
    starting a counter;

when the counter reaches a value, executing at least one first instruction in a first program to produce an intermediate result; and regardless of whether the at least one first instruction has been executed, executing at least one second instruction in a second program to determine a result of the second program, the result being an output of at least one arithmetic calculation based on the intermediate result such that when the intermediate result is incorrect or nonexistent, the result will be incorrect.

8. The method of claim 7, wherein if the at least one first instruction is executed at an incorrect time, the intermediate result is incorrect.

9. The method of claim 7, wherein executing at least one first instruction comprises producing at least one intermediate result on which the at least one arithmetic calculation to result of the second program depends.

10. The method of claim 7, wherein the counter is started by at least one third instruction of the second program.

11. At least one computer-readable storage device having stored thereon computer-executable instructions which, when executed, cause a computer to execute a method, the method comprising:

executing at least one first instruction in a first program to start a counter;

when the counter reaches a value, executing at least one second instruction in a second program; and regardless of whether the at least one second instruction has been executed, executing other instructions of the first program, the other instructions being a remainder of the first program following the at least one first instruction, to determine a result of the main program, the result being dependent on execution of the at least one second instruction.

12. The at least one computer-readable storage device of claim 11, wherein if the at least one second instruction is executed at an incorrect time, the result of the first program is incorrect.

13. The at least one computer-readable storage device of claim 11, wherein executing at least one second instruction comprises determining at least one intermediate result on which the result of the first program depends.

14. An apparatus comprising:
at least one processor to:
execute at least one first instruction in a first program to start a counter;
adjust a count value of the counter;
when the counter reaches a value, execute at least one second instruction in a second program; and
regardless of whether the at least one second instruction has been executed, execute other instructions of the first program, the other instructions being a remainder of the first program following the first instruction, to determine a result of the main program, the result being dependent on execution of the at least one second instruction.

15. The apparatus of claim 14, wherein the processor executes the other instructions without checking for timely execution of the at least one second instruction.

16. The apparatus of claim 14, wherein the at least one third instruction does not execute if the at least one second instruction is executed at an incorrect time.

17. The apparatus of claim 14, wherein if the at least one second instruction is executed at an incorrect time, the result of the first program is incorrect.

18. The apparatus of claim 14, wherein the at least one second instruction comprises determining at least one intermediate result on which the result of the first program depends.

19. The apparatus of claim 14, further comprising at least one computer-readable medium storing computer-executable instructions which cause the processor to execute the acts of executing and adjusting.

* * * * *